United States Patent
Kulkarni et al.

(10) Patent No.: US 9,417,654 B2
(45) Date of Patent: Aug. 16, 2016

(54) METHOD AND APPARATUS FOR HARDWARE-ASSISTED SECURE REAL TIME CLOCK MANAGEMENT

(71) Applicant: Intel Corporation, Santa Clara, CA (US)

(72) Inventors: Amol A. Kulkarni, Hillsboro, OR (US); Gyan Prakash, Beaverton, OR (US); Jayant Mangalampalli, Hyderabad (IN); Vani Yalapalli, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/992,030

(22) PCT Filed: Mar. 13, 2013

(86) PCT No.: PCT/US2013/030922
§ 371 (c)(1),
(2) Date: Jun. 6, 2013

(87) PCT Pub. No.: WO2014/142838
PCT Pub. Date: Sep. 18, 2014

(65) Prior Publication Data
US 2015/0378389 A1    Dec. 31, 2015

(51) Int. Cl.
*G06F 1/04* (2006.01)
*G06F 21/00* (2013.01)
*G06F 1/14* (2006.01)
(Continued)

(52) U.S. Cl.
CPC .. *G06F 1/04* (2013.01); *G06F 1/12* (2013.01); *G06F 1/14* (2013.01); *G06F 11/14* (2013.01); *G06F 21/00* (2013.01); *G06F 21/60* (2013.01); *G06F 1/30* (2013.01)

(58) Field of Classification Search
CPC .............. G06F 1/04; G06F 1/08; G06F 1/12
USPC ................................. 713/400, 500
See application file for complete search history.

(56) References Cited

U.S. PATENT DOCUMENTS 8,020,010 B2 *  9/2011  Pastorello ............. G06F 1/12
                                                  327/142
9,106,645 B1 *  8/2015  Vadlamani ........... G06F 21/725
(Continued)

FOREIGN PATENT DOCUMENTS

WO    WO-2014142838 A1    9/2014

OTHER PUBLICATIONS

"International Application Serial No. PCT/US2013/030922, International Preliminary Report on Patentability mailed Sep. 24, 2015", 6 pgs.
(Continued)

*Primary Examiner* — Chun Cao
(74) *Attorney, Agent, or Firm* — Schwegman Lundberg & Woessner, P.A.

(57) ABSTRACT

Embodiments of a system and method for secure clock management in a mobile device, or user equipment, are generally described herein. A timer offset may be calculated between a first secure clock time and a first network time. A reset delta based on at least the timer offset may be obtained and a recovered secure clock time based on at least the reset delta may be generated. A one-time password may be generated based on at least the recovered secure clock time.

25 Claims, 5 Drawing Sheets

(51) Int. Cl.
  *G06F 11/14* (2006.01)
  *G06F 1/12* (2006.01)
  *G06F 21/60* (2013.01)
  *G06F 1/30* (2006.01)

(56) References Cited

U.S. PATENT DOCUMENTS

| | | | | |
|---|---|---|---|---|
| 2006/0294593 | A1* | 12/2006 | Eldar | G06F 21/725 726/26 |
| 2009/0044021 | A1* | 2/2009 | Buck | H04L 9/321 713/178 |
| 2009/0327795 | A1 | 12/2009 | Priel et al. | |
| 2011/0173480 | A1 | 7/2011 | Bloomfield et al. | |
| 2012/0005721 | A1 | 1/2012 | Xu et al. | |
| 2012/0278880 | A1 | 11/2012 | Leterrier et al. | |
| 2013/0004142 | A1 | 1/2013 | Grab et al. | |

OTHER PUBLICATIONS

"International Application Serial No. PCT/US2013/030922, International Search Report mailed Dec. 12, 2013", 3 pgs.

"International Application Serial No. PCT/US2013/030922, Written Opinion mailed Dec. 12, 2013", 4 pgs.

* cited by examiner

METHOD AND APPARATUS FOR HARDWARE-ASSISTED SECURE REAL TIME CLOCK MANAGEMENT

CLAIM OF PRIORITY

This application is a U.S. National Stage Filing under 35 U.S.C. 371 from International Application No. PCT/US2013/030922, filed on Mar. 13, 2013, entitled USER AUTHENTICATION VIA IMAGE MANIPULATION, which application is incorporated herein by reference in its entirety.

TECHNICAL FIELD

Embodiments described herein pertain generally to wireless communications and in particular to methods and apparatus for hardware-assisted secure real time clock management.

BACKGROUND

Mobile devices (e.g. user equipment (UE)) or mobile device applications are sometimes provided one-time passwords by remote applications or servers that the mobile device may use to gain access to a remote application or server. A typical one-time password (OTP) is valid for a finite period of time and is reliant on the clocks of the UE and the server must be in sync with a secure clock maintained by the UE in order for the OTP to function correctly. Because battery power loss causes secure clock reset, the OTP cannot function correctly after such power loss in legacy wireless networks because the UE and server are out of sync subsequent to power loss.

DETAILED DESCRIPTION

Figure 1:
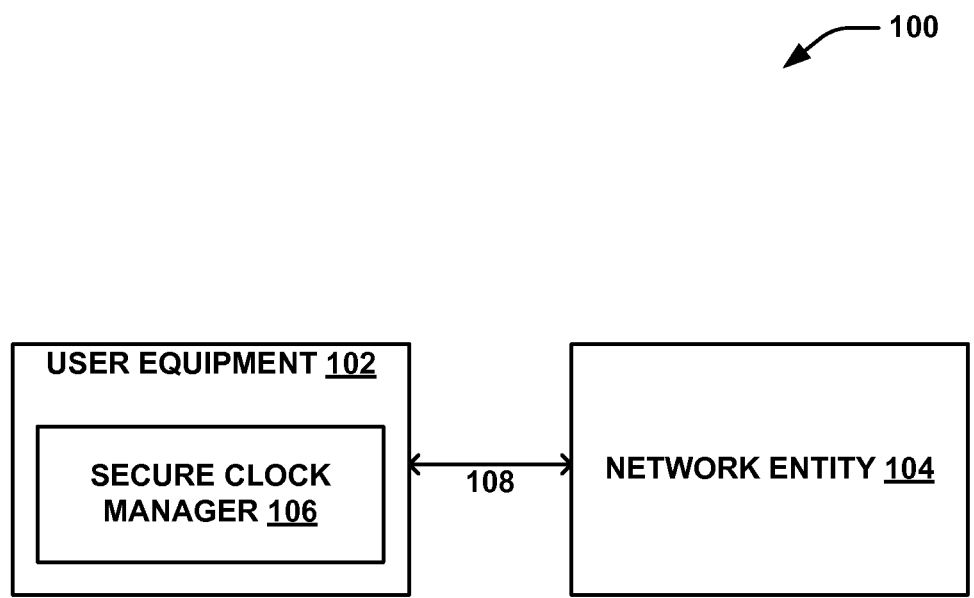
FIG. 1 is a schematic diagram illustrating a system for improved SRTC management, according to an example embodiment.

The present disclosure provides methods and apparatuses for enhancing one-time password (OTP) functionality on user equipment. When UE loses power, the secure clock loses is value and the functionality of the one-time password may be compromised upon reboot. Thus, there is a need for a system that provides secure clock integrity in the event of batter power loss.

UEs may utilize a secure real time clock SRTC for a variety of uses, any of which may be prone to degradation where the SRTC is reset during battery loss. One non-limiting example is the use of an OTP, which may be provisioned before power loss, but may be subject to incorrect OTP creation based on the provisioning subsequent to power loss. For example, prior to power loss A UE user may desire to utilize an OTP, which may be provisioned after the UE power source loses power. For example, the user may receive or otherwise obtain a token associated with a desired OTP before a UE battery loses power but may wish to utilize the OTP after the UE regains power and reboots. However, in legacy UEs, the token may be associated with a secure real time clock (SRTC), which may reset at battery loss. Thus, such an SRTC reset may limit the ability of the user to create and utilize the OTP based on the token after reboot, because such creation and utilization may be based on an incorrect post-reboot SRTC.

Using the embodiments described herein, a UE or a module therein may calculate an amount of time that the UE was powered down, which may be referred to as a "reset delta" herein. The UE may utilize this reset delta to reestablish a SRTC time to allow the user to utilize the OTP after the reboot.

For instance, in some non-limiting examples, the SRTC may be managed by UE module (e.g. a power management unit ("PMU")), which may initialize the SRTC at a predefined time during manufacturing (e.g. when UE firmware is provisioned). In such examples, the UE and its software or hardware modules are unable to reset or alter the SRTC. However, software modules may read the SRTC when running in a secure computing environment, such as when a UE receives or utilizes an OTP. After the SRTC experiences a reset due to power source drain, the UE may likewise attempt to read the SRTC, but the post-reset SRTC will not correspond to its pre-reset value upon which the OTP was based.

Thus, according to the present disclosure, to coordinate the pre- and post-reset SRTC values, one or more modules of the UE may first create a timer offset between a UE SRTC time and a reliable network time, for example, before power loss and/or reboot occurs. In an aspect, the UE may save this timer offset in a non-volatile memory for potential subsequent use by the UE upon reboot. Where such reboot occurs (e.g. due to battery power loss) the UE may set a reset flag in memory to indicate that such a reboot has occurred.

In an aspect, when the UE reboots, it may scan the memory to determine whether the reset flag has been set. If the UE scan finds that the reset flag has been set, the UE or a module therein (e.g. a secure clock manager) may compute or otherwise obtain a reset delta, which may represent a time period for which the UE remained powered down before reboot. In some examples, the reset delta may be computed as a post-reboot network time (e.g. received from the network upon reboot) minus the timer offset minus a post-reboot SRTC time value. Once computed, this reset delta may be saved in non-volatile memory and may be used to compute an adjusted SRTC time such that an OTP provisioned before the power loss may be utilized after the power loss.

Turning to the figures, FIG. 1 is a schematic diagram illustrating a system 100 for improved SRTC management, according to an example embodiment. FIG. 1 includes an example UE 102, which may communicate wirelessly with a network entity 104 over a wireless communication link 108.

In an aspect, the UE 102 may be a mobile device, such as, but not limited to, a smartphone, cellular telephone, mobile phone, laptop computer, tablet computer, or other portable networked device. In addition, UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable. Furthermore, UE 102 may include a secure clock manager 106, which may be configured to manage a secure clock (e.g. SRTC) associated with UE 102 and/or one or more OTPs.

In a further aspect, network entity 104 of FIG. 1 may include one or more of any type of network module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC), or a low-power access point, such as a picocell, femtocell, microcell, etc. Additionally, network entity 104 may communicate with one or more other network entities of wireless and/or core networks, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet.

Additionally, such network(s), which may include network entity 104, may comprise a Wideband Code Division Multiple Access (W-CDMA) system, and may communicate with one or more UEs 102 according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g. UE 102 and/or network entity 104) may be coupled to the network(s) via one or more wired or wireless connections.

Figure 2:
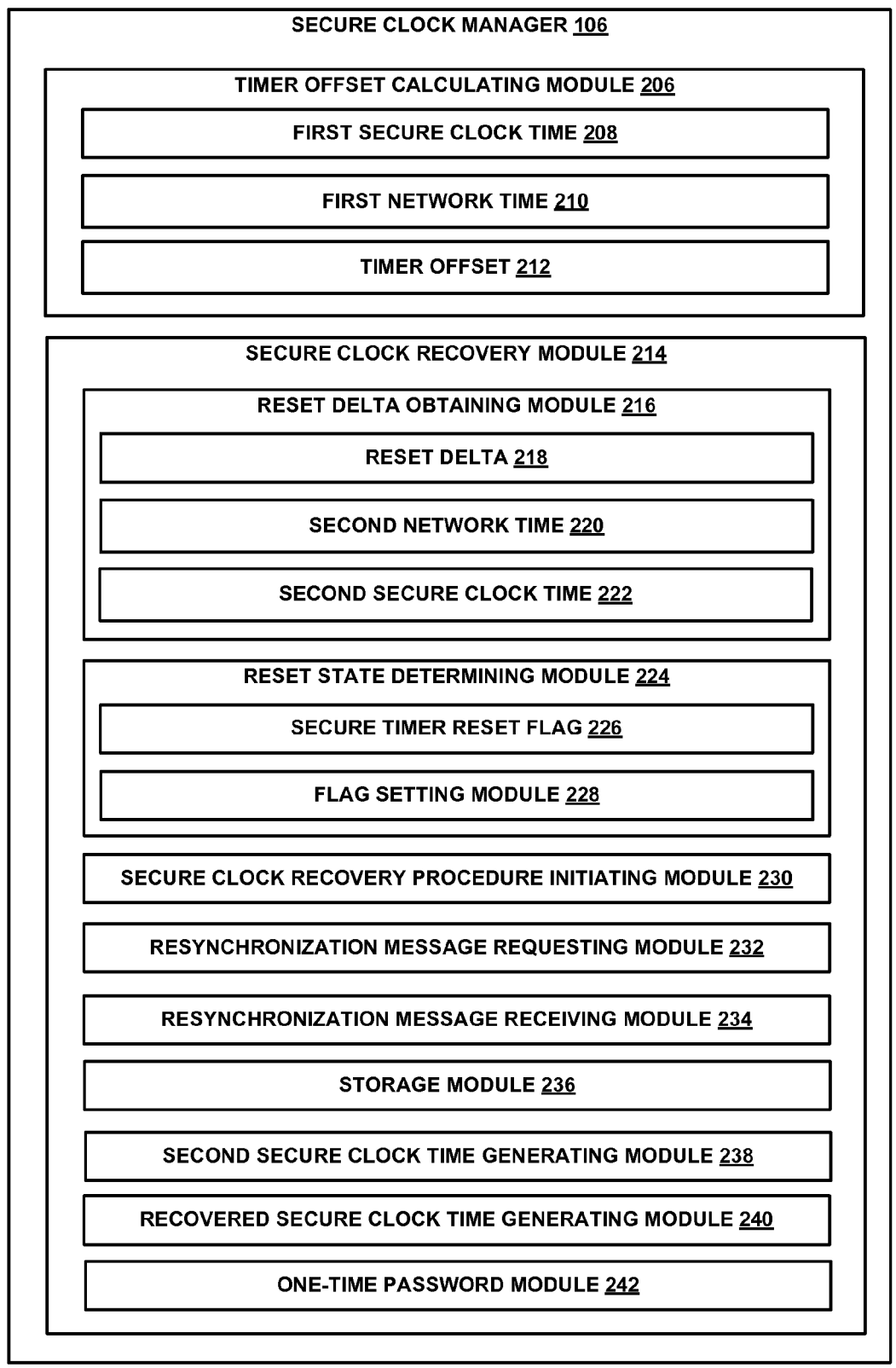
FIG. 2 is a block diagram illustrating an example secure clock manager, according to an example embodiment.

FIG. 2 is a block diagram illustrating an example secure clock manager 106, according to an example embodiment, which may be configured to manage a secure clock associated with a UE (e.g. UE 102 of FIG. 1). In an aspect, secure clock manager 106 may include a timer offset calculating module 206, which may be configured to calculate or otherwise obtain a timer offset 212. In some examples, timer offset calculating module 206 may obtain timer offset 212 by computing a time difference between the values of a first secure clock time 208 and a first network time value 210. First secure clock time 208 may represent a time value maintained by secure clock manager 106 that may serve as a basis for securely determining the duration of validity of a one-time password disseminated by a remote application, server, or other device or module to allow a UE (e.g. UE 102 of FIG. 1) access to the remote application, server, or other device or module for the duration of validity, which may be a limited duration. This first secure clock time 208 may be initially set at provisioning, but may also be set during one or more reboot processes, such as when a power is reintroduced to a UE after power loss (e.g. battery or capacitor power loss).

Furthermore, first secure clock time 208 may differ from a network time value, such as first network time 210. Unlike first secure clock time 208, first network time 210 may be a network-wide base time upon which scheduling and/or other time congruence is maintained across network devices and UEs of the network. In an aspect, first network time 210 may be a time value received from a network (e.g. from network entity 104 of FIG. 1) via a wireless message at network provisioning, reselection, handover, or the like. Again, timer offset 212 may be computed by timer offset calculating module 206 according to the following operation:

Timer Offset=First Secure Network Time−First Secure Clock Time

In addition, secure clock manager 106 may include a secure clock recovery module 214, which may be configured to recover a secure clock value upon reboot, for example, following a power loss. In an aspect, secure clock recovery module 214 may include a reset delta obtaining module 216, which may be configured to compute or otherwise obtain a reset delta 218, for example, after a reboot following power loss. In an aspect, reset delta 218 may represent a time value during which a UE (and therefore secure clock manager 106) was powered down before reboot. In an aspect, the reset delta obtaining module 216 may compute the reset delta 218 according to one or more of timer offset 212 (which may be stored in non-volatile memory, e.g. at a storage module 236), a second network time 220, and a second secure clock time 222. For example, in an aspect, reset delta obtaining module 216 may obtain reset delta 218 according to the following operation:

Reset Delta=Second Network time−Timer Offset− Second Secure Clock Time

In an aspect, second network time 220 may represent a time value obtained from a network (e.g. via a wireless message) upon reboot that may represent, like first secure clock time 208, a unitary clock time value for timing coordination across devices in a network and UEs utilizing the network. Furthermore, second secure clock time 222 may represent a post-reboot secure clock time (SRTC time) that may be configured or initiated during reboot. In an additional aspect, secure clock recovery module 214 may include a second secure clock time generating module 238, which may be configured to generate a second secure clock time 222 upon reboot of the UE. This second secure clock time 222 may differ from first secure clock time 208. By obtaining these values 220 and 222 in combination with timer offset 212 (which may be stored in non-volatile memory and accessible across instances of power down) secure clock recovery module may obtain reset delta 218, which, again, represents the duration of time the UE had been powered down before reboot.

In addition, secure clock manager 106 may include a reset state determining module 224, which may be configured, for example, at provisioning and/or reboot, to determine whether a secure clock reset occurred (e.g. due to power loss) and to set a flag (which may be accessible across power loss instances) to indicate such power loss has occurred. Where reset state determining module 224 determines that such secure clock reset occurred, secure clock recovery module 214 may initiate secure clock recovery procedures.

In an aspect, reset state determining module 224 may determine whether secure clock reset has occurred during reboot (or other power-up or provisioning procedures) by scanning non-volatile memory on the UE for a secure timer reset flag 226. Where reset state determining module 224 determines that such a secure timer reset flag 226 is present in non-volatile memory, a secure clock recovery procedure initiating module 230 may initiate secure clock recovery procedures. Alternatively, where no such secure timer reset flag 226 is present during scanning, the UE may operate as normal (e.g. without performing secure clock recovery procedures).

Furthermore, reset state determining module 224 may include a flag setting module 228, which may be configured to set a secure timer reset flag before full power loss occurs. For example, where power (e.g. battery power) reaches a threshold minimum value or when power down procedures have commenced or are to commence, the flag setting module may set secure timer reset flag 226 such that the secure clock recovery procedure initiating module 230 may initiate secure clock recovery procedures upon reboot.

In addition, secure clock recovery module 214 may include a resynchronization message requesting module 232 and/or a resynchronization message receiving module 234. In an aspect, resynchronization message requesting module 232 may be configured to generate and transmit a message requesting a network (e.g. via network entity 104 of FIG. 1) to provide the UE with a network time (e.g. second network time 220) upon reboot or perform any other resynchronization procedures after reboot. Additionally, resynchronization message requesting module 232 may be a transmitter, transceiver, or any other hardware module and/or related circuitry capable of transmitting and generating a wireless signal or message. Further, resynchronization message receiving module 234 may be configured to receive and decode a resynchronization message transmitted by a network entity (e.g. network entity 104 of FIG. 1) and decipher a second network time from such a message.

Additionally, in an aspect, secure clock recovery module 214 may include a one-time password module 242, which may be configured to generate, regenerate, reinitialize, or otherwise obtain one or more OTPs based on a post-reboot, or recovered, secure clock time, which may be related to second secure clock time 222 and reset delta 218, for example, according to the following algorithm:

Recovered Secure Clock Time=Second Secure Clock Time+Reset Delta

In an aspect, such a recovered secure clock time may be generated by a recovered secure clock time generating module 240, which may be a module of secure clock recovery module 214.

Figure 3:
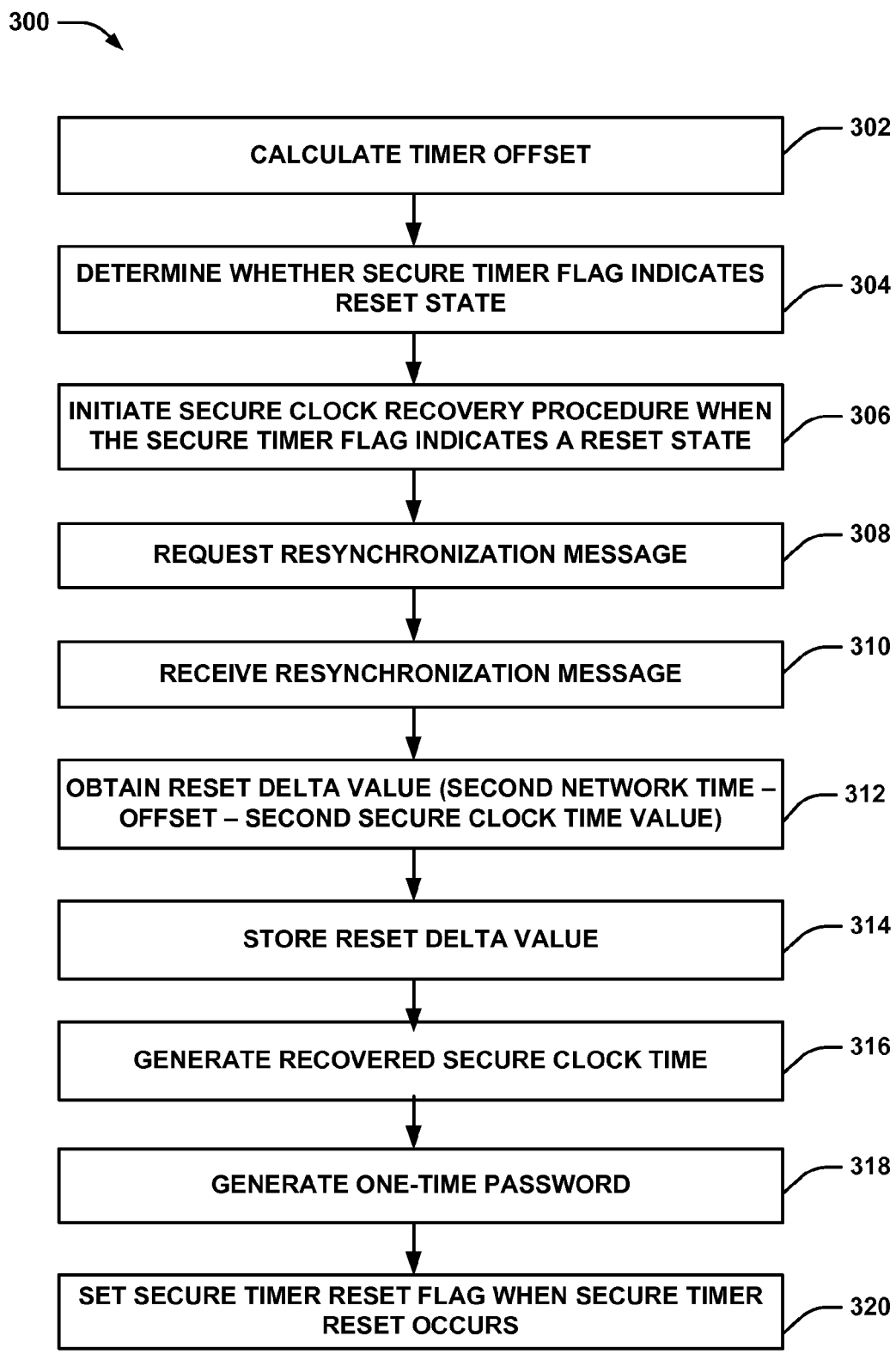
FIG. 3 is a flowchart illustrating a method for improved secure close management in UEs, according to an example embodiment.

FIG. 3 is a flowchart illustrating a method 300 for improved secure clock management, according to some example embodiments. In some examples, method 300 and/or any of the method steps comprising method 300 may be configured to be performed by a processing apparatus, which may include UE 102 of FIG. 1, and/or a method therein, for example. In an aspect, method 300 may include calculating a timer offset between a first secure clock time and a first network time at block 302. In addition, at block 304, method 300 may include determining whether a secure timer flag indicates a reset state. Further, at block 306, method 300 may include initiating a secure clock recovery procedure when the secure timer flag indicates a reset state.

In a further aspect, at blocks 308 and 310, respectively, method 300 may include requesting and receiving a resynchronization message. In an aspect, the resynchronization message may be integrity protected, which may include the resynchronization message containing a private key, a cyclic redundancy check bit or bits, or other integrity protection or encryption to ensure that the resynchronization message is reliable. In an additional aspect, the resynchronization message may include a network time value, such as a second network time value.

Furthermore, at block 312, method 300 may include obtaining a reset delta based on at least the timer offset. In an aspect, the UE or module therein may obtain the reset delta by subtracting the second secure clock time and the timer offset from the second network time. Additionally, at block 314, method 300 may include storing the reset delta value, for example, in a non-volatile memory.

In addition, at block 318, method 300 may include generating a one-time password based on a recovered secure clock time, which may be generated at block 316. Additionally, at block 320, method 300 may include securing a timer reset flag when a secure time reset occurs or before such a reset occurs.

In some aspects, where more than one secure clock reset has occurred over the life of the processing apparatus (e.g. UE 102), method 300 may include storing multiple reset data values—each corresponding to a reset. Thus, using these reset delta values, method 300 may include storing, at block 318, a recovered secure clock time based on at least the reset delta or multiple reset deltas. In an aspect, the recovered secure clock time may be computed according to the following algorithm, where N represents the amount of resets during the lifetime of the UE:

$$\text{Rec. Secure Clock Time} = \text{Second Secure Clock Time} + \sum_{n=0}^{N} \text{Reset Delta}_n$$

In an additional aspect, tokens associated with one or more OTPs may be provisioned and even used in the midst of an SRTC reset. In a non-limiting example, for instance, a first OTP token (Token 1) provisioning may occur and SRTC notifications may be requested by the UE. Further, in such an example, a version number may be stored along with the SRTC reset flag, which the UE may increment each time the SRTC is reset. In an aspect, the time offset stored in Token 1 may be stored as per a current SRTC, which may be referred to as SRTC 1. Furthermore, at some time after Token 1 is provisioned, an SRTC reset event may occur.

In this example, after the SRTC reset occurs and before the UE (or and application controlling Token 1) is able to request an OTP (and thereby run a recovery sequence), a second application provisions an OTP for a new, unique OTP token (Token 2).

As a result, Token 2 may have a timer offset calculated according to the new, post-reset SRTC (SRTC 2). As long as the new SRTC stays as-is, all OTPs generated by Token 2 will be correct, and OTP generation for Token 2 will not result in SRTC any resync mechanism. Additionally Token 2 may create and store have an associated flag indicating it was provisioned before the SRTC was recovered, as well as the SRTC version (here, SRTC 2). However, if application 1 now requests an OTP from Token 1, the SRTC reset will be detected and an SRTC recovery will occur, making OTPs from Token 1 valid instead of the OTPs of Token 2 (according to the present disclosure, a reset delta calculated by one token is usable by all other tokens on the device, irrespective of which servers or applications they correspond to).

However, this recovery will now cause problems for Token 2 and the OTP(s) derived therefrom. To solve this issue, the UE may update the offset stored for Token 2 (or any other token) using the formula:

$$\text{New timer offset} = \text{New Server Time} - \text{New SRTC} - \text{reset delta}.$$

Once the offset is updated for Token 2, it may begin using the SRTC 2 and the reset delta for all future OTP operations. Furthermore, Application 2 may subsequently perform this recovery when it requests an OTP for Token 2 and finds that the SRTC flag is no longer reset, indicating that a pre-provisioned token performed recovery for the entire system. Once the recovery for Token 2 is performed, all flags and version numbers stored inside the token may be cleared.

In an additional example associated with the previous example, after OTPs for Token 2 are correctly generated and before the UE attempts to generate an OTP associated with Token 1, the SRTC reset flag may still be set. In a further aspect of this additional example, a second SRTC reset may occur—i.e. the SRTC flag is still set and the SRTC version is incremented. In such an example, the next time Token 2 is used for OTP generation, the UE or application associated with Token 2 may query the SRTC reset flag and may determine that the SRTC flag is still set, but also that the version number has been incremented compared to the version number stored internally.

In such an example scenario, the UE or application of Token 2 may again compute and update a new timer offset according to the equation:

$$\text{New timer offset} = \text{New Server Time} - \text{New SRTC} - \text{reset delta}.$$

Furthermore, the UE or application running thereon may likewise update an internal version number associated with the application of Token 2 or Token 2, generally, to match the SRTC version number. In this manner, Token 2 may keep up with any number of SRTC resets until Token 1 is activated to recover the SRTC for the entire system. Once Token 1 recovers the clock for the entire system, Token 2 may perform a final recovery and may clear out its internal SRTC flag and version number, as with the previous example above.

Figure 4:
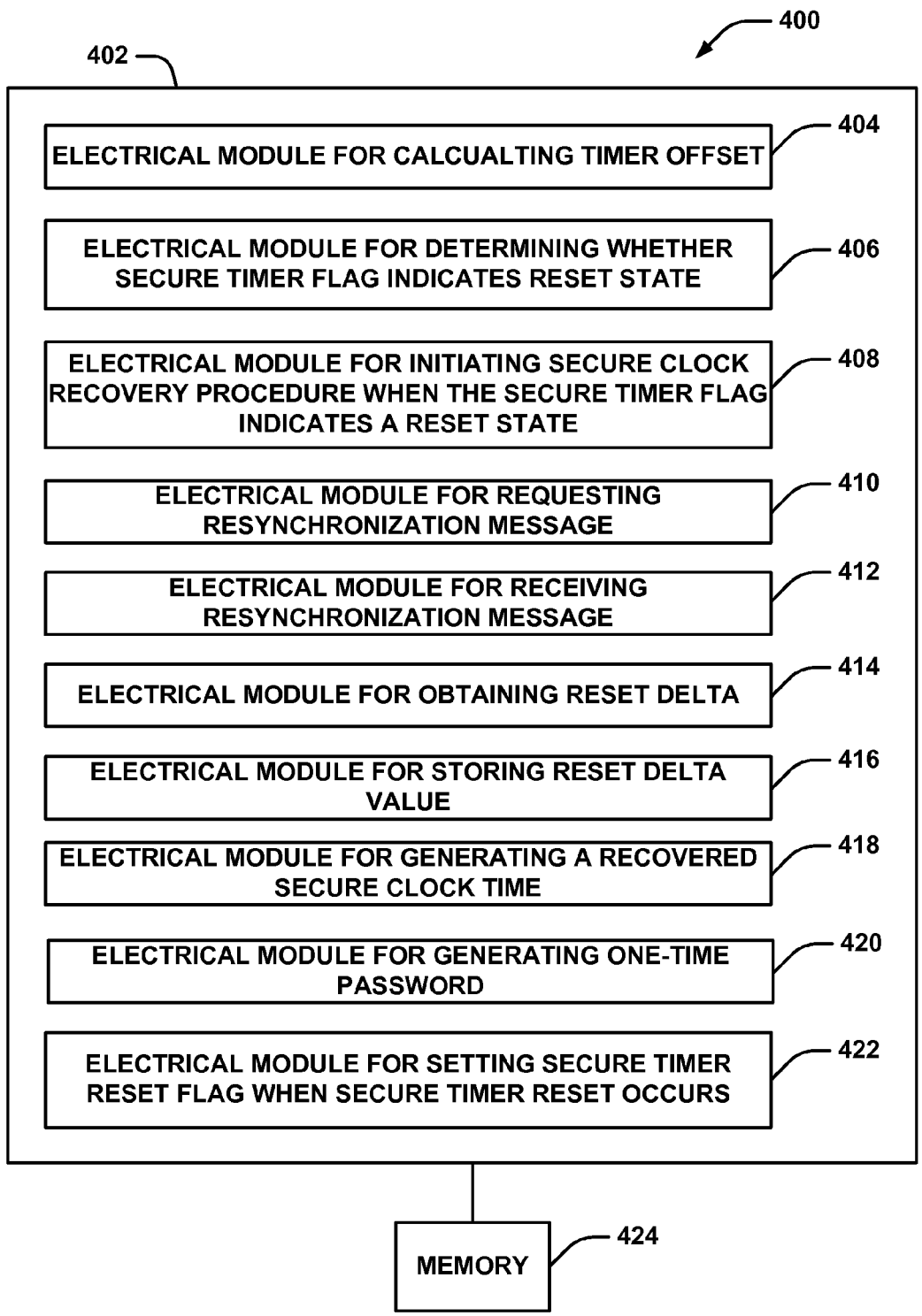
FIG. 4 is a block diagram illustrating an example system for improved secure close management in a UE, according to an example embodiment.

Referring to FIG. 4, an example system 400 is displayed for improved secure clock management in a UE, according to an example embodiment. For example, system 400 may reside at least partially within a UE (e.g. UE 102 of FIG. 1), such as a UE or network entity. It is to be appreciated that system 400 is represented as including functional blocks, which may be functional blocks that represent functions implemented by a processor, software, or combination thereof (e.g. firmware). System 400 includes a logical grouping 402 of electrical modules that may act in conjunction. For instance, logical grouping 402 may include an electrical module 404 for calculating a timer offset. In an aspect, electrical module 404 may comprise timer offset calculating module 206 (FIG. 2). Additionally, logical grouping 402 may include an electrical module 406 for determining whether a secure timer flag indicates a reset state. In an aspect, electrical module 406 may comprise reset state determining module 224 (FIG. 2). In an additional aspect, logical grouping 402 may include an electrical module 408 for initiating a secure clock recovery procedure when the secure timer flag indicates a reset state. In an aspect, electrical module 408 may comprise secure clock recovery procedure initiating module 230 (FIG. 2). Furthermore, logical grouping 402 may include electrical modules 410 and 412 for requesting and receiving a resynchronization message, respectively. In an aspect, electrical modules 410 and 412 may comprise resynchronization message requesting module 232 and resynchronization message receiving module 234, respectively (FIG. 2).

In an additional aspect, logical grouping 402 may include an electrical module 414 for obtaining a reset delta. In an aspect, electrical module 414 may comprise reset delta obtaining module 216 (FIG. 2). In an additional aspect, logical grouping 402 may include an electrical module 416 for storing a reset delta. In an aspect, electrical module 416 may comprise storage module 236 (FIG. 2). Moreover, logical grouping 402 may include an electrical module 418 for generating a recovered secure clock time. In an aspect, electrical module 418 may comprise recovered secure clock time generating module 240 (FIG. 2). Still further, logical grouping 402 may include an electrical module 420 for generating a one-time password. In an aspect, electrical module 420 may comprise one-time password module 242 (FIG. 2). Furthermore, logical grouping 402 may include an electrical module 422 for setting a secure timer reset flag when a secure timer reset occurs. In an aspect, electrical module 422 may comprise flag setting module 228 (FIG. 2).

Additionally, system 400 may include a memory 424 that retains instructions for executing functions associated with electrical modules 404, 406, 408, 410, 412, 414, 416, 418, 420, and 422, stores data used or obtained by electrical modules 404, 406, 408, 410, 412, 414, 416, 418, 420, and 422, etc. While shown as being external to memory 424, it is to be understood that one or more of electrical modules 404, 406, 408, 410, 412, 414, 416, 418, 420, and 422 may exist within memory 424. In one example, electrical modules 404, 406, 408, 410, 412, 414, 416, 418, 420, and 422 may comprise at least one processor, or each electrical module 404, 406, 408, 410, 412, 414, 416, 418, 420, and 422 may be a corresponding module or module of at least one processor. Moreover, in an additional or alternative example, one or more electrical modules 404, 406, 408, 410, 412, 414, 416, 418, 420, and 422 may be a computer program product including a computer readable medium, where the respective electrical module 404, 406, 408, 410, 412, 414, 416, 418, 420, and 422 may be corresponding code.

Figure 5:
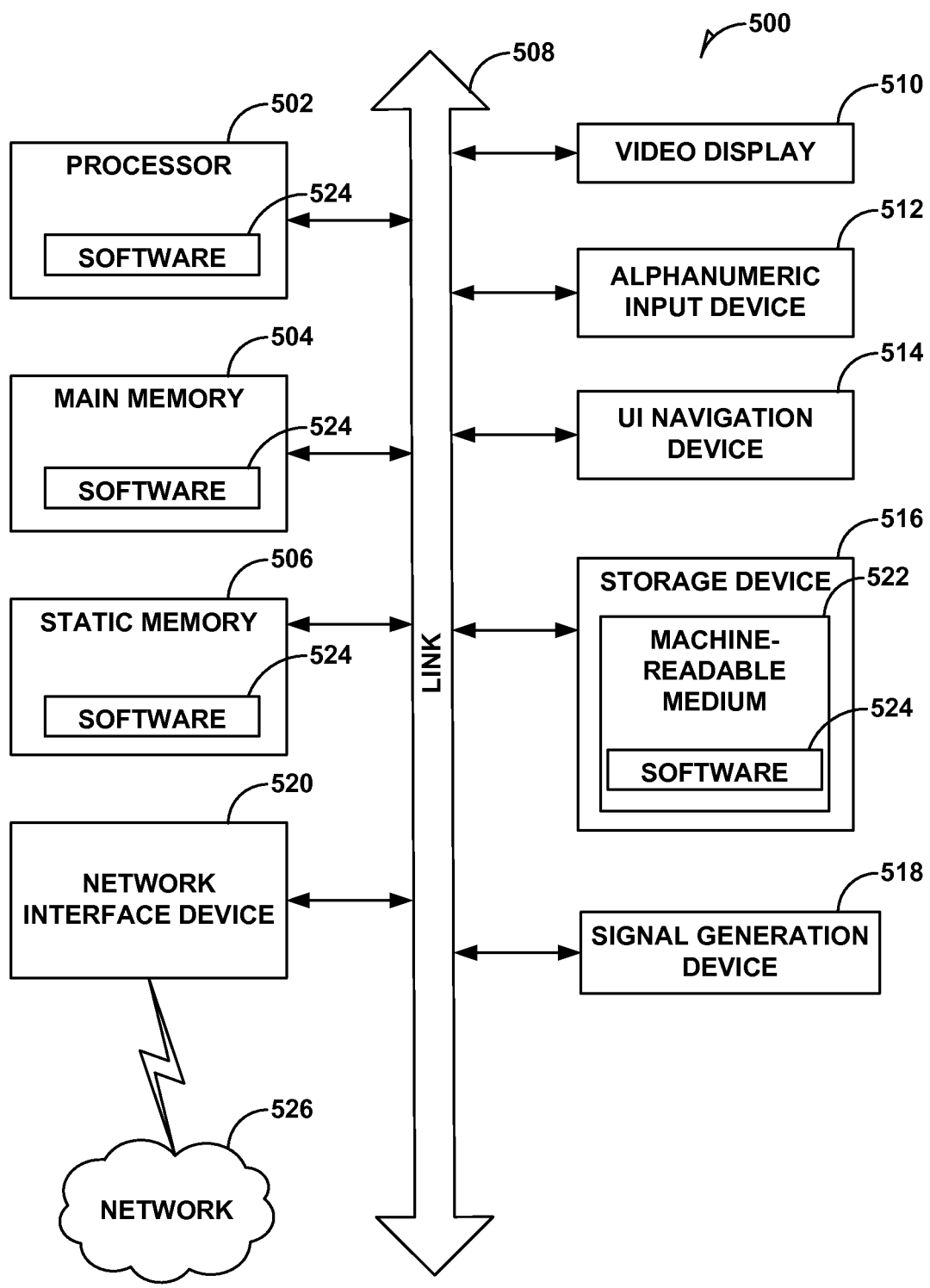
FIG. 5 is a block diagram illustrating a machine in the example form of a computer system, within which a set or sequence of instructions for causing the machine to perform any one of the methodologies discussed herein may be executed, according to an example embodiment.

FIG. 5 is a block diagram illustrating a machine in the example form of a computer system 500, within which a set or sequence of instructions for causing the machine to perform any one of the methodologies discussed herein may be executed, according to an example embodiment. In alternative embodiments, the machine operates as a standalone device or may be connected (e.g. networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g. a central processing unit (CPU), a graphics processing unit (GPU) or both, processor cores, compute nodes, etc.), a main memory 504 and a static memory 506, which communicate with each other via a link 508 (e.g. bus). The computer system 500 may further include a video display unit 510, an alphanumeric input device 512 (e.g. a keyboard), and a user interface (UI) navigation device 514 (e.g. a mouse). In one embodiment, the video display unit 510, input device 512 and UI navigation device 514 are incorporated into a touch screen display. The computer system 500 may additionally include a storage device 516 (e.g. a drive unit), a signal generation device 518 (e.g. a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g. software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g. a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g. Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g. HTTP). Examples of communication networks include a local area network (LAN), a wide area network (WAN), the Internet, mobile telephone networks, Plain Old Telephone (POTS) networks, and wireless data networks (e.g. Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of modules, modules, or mechanisms. Modules are tangible entities capable of performing specified operations and may be configured or arranged in a certain manner. In an example, circuits may be arranged (e.g. internally or with respect to external entities such as other circuits) in a specified manner as a module. In an example, the whole or part of one or more computer systems (e.g. a standalone, client or server computer system) or one or more hardware processors may be configured by firmware or software (e.g. instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the terms "module" and "module" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which modules are temporarily configured, one instantiation of a module may not exist simultaneously with another instantiation of the same or different module. For example, where the modules comprise a general-purpose hardware processor configured using software, the general-purpose hardware processor may be configured as respective different modules at different times. Accordingly, software may configure a hardware processor, for example, to constitute a particular module at one instance of time and to constitute a different module at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

ADDITIONAL NOTES & EXAMPLES

Example 1 may include subject matter (such as an apparatus, mobile apparatus, user equipment, network device, communication apparatus or device, hardware, module, or component) comprising a timer offset calculating module configured to calculate a timer offset between a first secure clock time and a first network time, a reset delta obtaining module configured to obtain a reset delta based on at least the timer offset, and a secure clock time generating module configured to generate a recovered secure clock time based on at least the reset delta.

Example 2 may include, or may optionally be combined with the subject matter of Example 1 to optionally include a reset state determining module configured to determine whether a secure timer reset flag indicates a reset state, and a secure clock recovery procedure initiating module configured to initiate the secure clock recovery procedure where the secure timer reset flag indicates a reset state.

Example 3 may include, or may optionally be combined with the subject matter of Examples 1 and/or 2 to optionally include a flag setting module configured to set the secure timer reset flag where secure timer reset occurs.

Example 4 may include, or may optionally be combined with the subject matter of one or any combination of Examples 1 through 3 to optionally include a resynchronization requesting module configured to request a timer resynchronization message from a network entity.

Example 5 may include, or may optionally be combined with the subject matter of one or any combination of Examples 1 through 4 to optionally include a message receiving module configured to receive a timer resynchronization message from a network entity.

Example 6 may include, or may optionally be combined with the subject matter of one or any combination of Examples 1 through 5, wherein the timer resynchronization message is integrity protected.

Example 7 may include, or may optionally be combined with the subject matter of one or any combination of Examples 1 through 6, wherein the reset delta obtaining module is further configured to obtain the reset delta by subtracting the second secure clock time and the timer offset from the second network time.

Example 8 may include, or may optionally be combined with the subject matter of one or any combination of Examples 1 through 7 to optionally include a storage module configured to store the reset delta in a nonvolatile memory.

Example 9 may include, or may optionally be combined with the subject matter of one or any combination of Examples 1 through 8 to optionally include a registration module configured to register for one or more reset notifications.

Example 10 may include, or may optionally be combined with the subject matter of one or any combination of Examples 1 through 9 to optionally include a one-time password module configured to generate a one-time password based on at least the recovered secure clock time.

Example 11 may include subject matter (such as a method, means for performing acts, machine readable medium including instructions that, when performed by a machine cause the machine to performs acts, or an apparatus configured to perform), which may optionally be in addition to any one or combination of Examples 1-10, comprising calculating a timer offset between a first secure clock time and a first network time, obtaining a reset delta based on at least the timer offset, and generating a recovered secure clock time based on at least the reset delta.

Example 12 may include, or may optionally be combined with the subject matter of Example 11 to optionally include determining whether a secure timer reset flag indicates a reset state and initiating the secure clock recovery procedure where the secure timer reset flag indicates a reset state.

Example 13 may include, or may optionally be combined with the subject matter of either of Example 11 and/or Example 12 to optionally include setting the secure timer reset flag where secure timer reset occurs.

Example 14 may include, or may optionally be combined with the subject matter of one or any combination of Examples 11 through 13 to optionally include requesting a timer resynchronization message from a network entity.

Example 15 may include, or may optionally be combined with the subject matter of one or any combination of Examples 11 through 14 to optionally include receiving a timer resynchronization message from a network entity.

Example 16 may include, or may optionally be combined with the subject matter of one or any combination of Examples 11 through 15 to optionally include the timer resynchronization message being integrity protected.

Example 17 may include, or may optionally be combined with the subject matter of one or any combination of Examples 11 through 16 to optionally include comprising obtaining the reset delta by subtracting the second secure clock time and the timer offset from the second network time.

Example 18 may include, or may optionally be combined with the subject matter of one or any combination of Examples 11 through 17 to optionally include storing the reset delta in a nonvolatile memory.

Example 19 may include, or may optionally be combined with the subject matter of one or any combination of Examples 11 through 18 to optionally include registering for one or more reset notifications.

Example 20 may include, or may optionally be combined with the subject matter of one or any combination of Examples 11 through 19 to optionally include generating a one-time password based on at least the recovered secure clock time.

What is claimed is:

1. An apparatus for wireless clock management, the apparatus comprising:
    a timer offset calculating circuit configured to calculate a timer offset between a first secure clock time and a first network time;
    a reset delta obtaining circuit configured to obtain a reset delta based on at least the timer offset, the reset delta including a value that represents a time duration during which the apparatus has been inoperative; and
    a secure clock time generating circuit configured to generate a recovered secure clock time based on at least the reset delta.

2. The apparatus of claim 1, further comprising:
    a reset state determining circuit configured to determine whether a secure timer reset flag indicates a reset state; and
    a secure clock recovery procedure initiating circuit configured to initiate the secure clock recovery procedure where the secure timer reset flag indicates a reset state.

3. The apparatus of claim 2, further comprising a flag setting circuit configured to set the secure timer reset flag where secure timer reset occurs.

4. The apparatus of claim 1, further comprising a resynchronization requesting circuit configured to request a timer resynchronization message from a network entity.

5. The apparatus of claim 2, further comprising a message receiving circuit configured to receive a timer resynchronization message from a network entity.

6. The apparatus of claim 5, wherein the timer resynchronization message is integrity protected.

7. The apparatus of claim 1, wherein the reset delta obtaining circuit is further configured to obtain the reset delta by subtracting the second secure clock time and the timer offset from the second network time.

8. The apparatus of claim 1, further comprising a storage circuit configured to store the reset delta in a nonvolatile memory.

9. The apparatus of claim 1, further comprising a registration circuit configured to register for one or more reset notifications.

10. The apparatus of claim 1, further comprising a one-time password circuit configured to generate a one-time password based on at least the recovered secure clock time.

11. A method of wireless clock management executed by a processing apparatus including computing hardware, the method comprising:
    calculating, by the processing apparatus, a timer offset between a first secure clock time and a first network time;
    obtaining, by the processing apparatus, a reset delta based on at least the timer offset, the reset delta including a value that represents a time duration during which the processing apparatus has been inoperative; and
    generating, by the processing apparatus, a recovered secure clock time based on at least the reset delta.

12. The method of claim 11, further comprising:
  determining whether a secure timer reset flag indicates a reset state; and
  initiating the secure clock recovery procedure where the secure timer reset flag indicates a reset state.

13. The method of claim 11, further comprising requesting a timer resynchronization message from a network entity.

14. The method of claim 11, further comprising receiving a timer resynchronization message from a network entity.

15. The method of claim 11, further comprising obtaining the reset delta by subtracting the second secure clock time and the timer offset from the second network time.

16. The method of claim 11, further comprising storing the reset delta in a nonvolatile memory.

17. The method of claim 11, further comprising registering for one or more reset notifications.

18. The method of claim 11, further comprising generating a one-time password based on at least the recovered secure clock time.

19. At least one machine readable medium comprising a plurality of instructions that in response to being executed on a computing device, cause the computing device to:
  calculate a timer offset between a first secure clock time and a first network time;
  obtain a reset delta based on at least the timer offset, the reset delta including a value that represents a time duration during which the computing device has been inoperative; and
  generate a recovered secure clock time based on at least the reset delta.

20. The at least one machine readable medium of claim 19, further comprising a plurality of instructions that in response to being executed on a computing device, cause the computing device to:
  determine whether a secure timer reset flag indicates a reset state; and
  initiate the secure clock recovery procedure where the secure timer reset flag indicates a reset state.

21. The at least one machine readable medium of claim 19, further comprising a plurality of instructions that in response to being executed on a computing device, cause the computing device to request a timer resynchronization message from a network entity.

22. The at least one machine readable medium of claim 19, further comprising a plurality of instructions that in response to being executed on a computing device, cause the computing device to receive a timer resynchronization message from a network entity.

23. The at least one machine readable medium of claim 19, further comprising a plurality of instructions that in response to being executed on a computing device, cause the computing device to obtain the reset delta by subtracting the second secure clock time and the timer offset from the second network time.

24. The at least one machine readable medium of claim 19, further comprising a plurality of instructions that in response to being executed on a computing device, cause the computing device to store the reset delta in a nonvolatile memory.

25. The at least one machine readable medium of claim 19, further comprising a plurality of instructions that in response to being executed on a computing device, cause the computing device to generate a one-time password based on at least the recovered secure clock time.

* * * * *